United States Patent
Moore et al.

(10) Patent No.: US 11,316,325 B2
(45) Date of Patent: Apr. 26, 2022

(54) GROUND MAT COUPLING SYSTEMS AND METHODS

(71) Applicant: Eaton Intelligent Power Limited, Dublin (IE)

(72) Inventors: Matthew A. Moore, Portland, OR (US); Michael Peters, Lakewood, CO (US); David Shipp, Murrysville, PA (US)

(73) Assignee: Eaton Intelligent Power Limited, Dublin (IE)

( * ) Notice: Subject to any disclaimer, the term of this patent is extended or adjusted under 35 U.S.C. 154(b) by 49 days.

(21) Appl. No.: 16/738,776

(22) Filed: Jan. 9, 2020

(65) Prior Publication Data
US 2020/0227896 A1   Jul. 16, 2020

Related U.S. Application Data (60) Provisional application No. 62/791,303, filed on Jan. 11, 2019.

(51) Int. Cl.
| | |
|---|---|
| *H02H 3/08* | (2006.01) |
| *H02H 3/02* | (2006.01) |
| *H02B 1/16* | (2006.01) |
| *H02H 7/22* | (2006.01) |
| *H01C 7/12* | (2006.01) |

(52) U.S. Cl.
CPC .............. *H02B 1/16* (2013.01); *H01C 7/12* (2013.01); *H02H 7/22* (2013.01)

(58) Field of Classification Search
CPC ............. H02H 7/22; H02B 1/16; H01C 7/12

USPC ........................................................ 361/93.1
See application file for complete search history.

(56) References Cited

U.S. PATENT DOCUMENTS

| | | | | |
|---|---|---|---|---|
| 6,477,027 | B1 * | 11/2002 | McKelvy | H05F 3/025 174/544 |
| 6,888,709 | B2 * | 5/2005 | Princinsky | H02H 9/04 361/107 |
| 8,976,550 | B2 * | 3/2015 | Hsiao | H02H 7/125 363/52 |
| 2002/0054465 | A1 * | 5/2002 | Gerlach | H01T 4/06 361/111 |

* cited by examiner

*Primary Examiner* — Jared Fureman
*Assistant Examiner* — Lucy M Thomas
(74) *Attorney, Agent, or Firm* — Stanek Lemon Crouse & Meeks, P.A.

(57) ABSTRACT

An apparatus includes a first terminal configured to be coupled to a substation around mat for a substation and a second terminal configured to be coupled to a safety around mat for a piece of electrical equipment powered by the substation. The system further includes at least one voltage-dependent resistance device, such as at least one metal oxide varistor (MOV) configured to be coupled between the first and second terminals. At least one circuit interruption device, such as a fuse and/or a disconnect switch may be coupled in series with the at least one voltage-dependent resistance device.

20 Claims, 7 Drawing Sheets

GROUND MAT COUPLING SYSTEMS AND METHODS

CROSS-REFERENCE TO RELATED APPLICATION

This application claims priority to U.S. Provisional Application No. 62/791,303, filed Jan. 11, 2019, the content of which is hereby incorporate herein by reference in its entirety.

BACKGROUND

The inventive subject matter relates to electrical power apparatus and methods and, more particularly, to grounding apparatus and methods for electrical power systems.

Portable electric excavators, shovels, and other equipment used in mining applications may require special grounding design considerations. Because an electric shovel can move and be located a significant distance from the substation that powers it, there typically is not a bona fide ground mat beneath the shovel. Consequently, step and touch potentials for personnel stepping onto or touching the shovel may not be controlled. For example, if the source substation only has a single around mat, a high voltage (primary source) ground fault to that ground mat can generate a voltage at the shovel via the trailing cable's ground conductor. A person stepping onto or touching the shovel at that instant is subject to this voltage.

Figure 1:
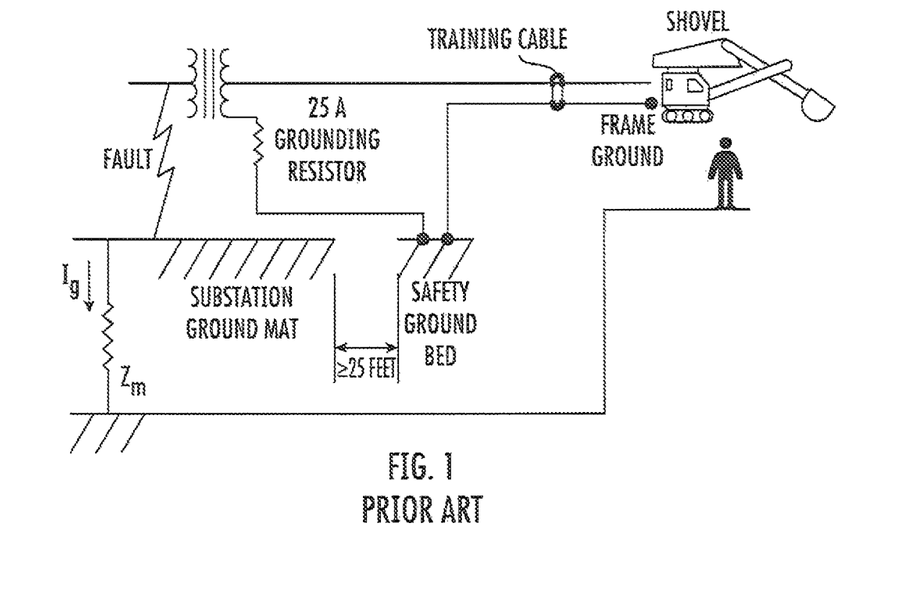
FIG. 1 is a schematic diagram illustrating a conventional grounding arrangement for mining applications.

To reduce or eliminate this risk, the U.S. Mine Safety and Health Administration (MHSA), requires that a safety ground bed located no closer to the main substation than 25 feet, as illustrated in FIG. 1. For a primary system ground fault to the main substation ground mat, the voltage difference generated by the fault is transferred to the safety ground mat and not to the shovel. This can improve personnel safety at the shovel.

However, there has been history of the trailing ground conductor monitor and/or the secondary grounding resistor relay failing because these devices may have an excessive voltage difference between the main substation ground mat and the safety ground mat impressed across them. Depending on factors such as the available ground fault current on the primary and the ground mat resistances to remote earth and lightning strikes that the primary arresters discharge into the main substation ground mat, the relays are subject to failure. A known case has had them fail with an arc flash event to which operators of the ground conductor monitor were exposed.

SUMMARY

Some embodiments of the inventive subject matter provide an apparatus including a first terminal configured to be coupled to a substation ground mat for a substation and a second terminal configured to be coupled to a safety ground mat for a piece of electrical equipment powered by the substation. The system further includes at least one voltage-dependent resistance device, such as at least one metal oxide varistor (MOV) configured to be coupled between the first and second terminals.

In some embodiments, the at least one voltage-dependent resistance device may include a first MOV having a first breakdown voltage and a second MOV coupled in series with the first MOV and having a second breakdown voltage less than or equal to the first breakdown voltage. The second MOV may be configured to be bypassed while the first MOV is coupled between the first and second terminals.

The apparatus may further include at least one circuit interruption device coupled in series with the at least one voltage-dependent resistance device. The at least one circuit interruption device may include a current-responsive circuit interruption device, such as a fuse. The apparatus may further include an indicator device configured to be triggered by the current-responsive circuit interruption device. The at least one circuit interruption device may further include a disconnect switch coupled in series with the current-responsive circuit interruption device.

According to further embodiments, an apparatus includes an enclosure, a first terminal configured to be coupled to a substation ground mat for a substation, and a second terminal configured to be coupled to a safety ground mat for a piece of electrical equipment powered by the substation. The apparatus further includes at least one varistor mounted in the enclosure and a fuse mounted in the enclosure and coupled in series with the at least one varistor between the first and second terminals. The apparatus may also include an indicator device, such as a contact set, mounted in the enclosure and configured to be triggered by the fuse. The apparatus may further include a disconnect switch mounted in the enclosure and coupled in series with the fuse and the at least one varistor. The enclosure may be configured to be installed at the substation.

Some embodiments provide methods including connecting a safety ground mat for a piece of electrical equipment powered by a substation to a substation ground mat for the substation via at least one voltage-dependent resistance device. The at least one voltage-dependent resistance device may include at least one varistor. A fuse may be connected in series with the at least one varistor. An indicator device may be coupled to the fuse.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and or "comprising," when used in this specification, specify the presence of stated features, integers, steps, operations, items, and/or components, but do not preclude the presence or addition of one or more other features, integers, steps, operations, items, components, and/or groups thereof.

Unless otherwise, defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As noted above, voltages generated between a substation ground mat and a safety ground mat may result in generation of undesirable excessive voltages across equipment in a mining installation. Since regulations require that the substation and safety ground mats not be tied together, embodiments of the inventive subject provide ways that can limit the ground mat voltage difference to a level that reduces or prevents damage to equipment, such as a trailing ground conductor monitor and/or the secondary grounding resistor relay, while still satisfying MSHA requirements that the ground mats remain separate.

Potential solutions may involve various isolation techniques. The ground monitor relay (GMR) could be housed in a separate nonconductive cabinet, thus using physical distance between the relay and the main substation ground mat. For example, the GMR could be mounted on an internal swing panel in a cabinet with an outer door to protect from weather, with the cabinet being mounted on a nonmetallic post to put the panel at a convenient height for an operator. The panel could be located at least 6 feet away from the substation ground mat, with the GMR tied to the safety ground mat. To operate or interface with the GMR, the outer door could be positioned such that it is on the opposite side front the substation, to reduce the likelihood that a person might inadvertently touch anything connected to the substation. The operator could stand on a flat metallic grate interfacing with the GMR, with this plate being bonded to the safety ground mat conductor. A control cable for control power, etc., may be fed from the main substation, with metal oxide varistor (MOV) surge protection devices. If the neutral grounding resistor monitor (NGRM) is connected to the remote safety ground bed as shown, it can be mounted here as well.

An alternative installation for the NGRM is to mount it internal to the substation on its own stand-off insulators. The resistive voltage divider (RVD) that connects to the wye point of the transformer may have conductors rated for the neutral to ground voltage (VNG) to and from it because, if the divider fails, the VNG could be generated on the monitor case under a ground fault condition. A better location for the RV D may be external in the neutral ground resistor (NGR) cabinet itself.

Another option is to place the GMR on a nonmetallic inner swing door. The GMR and other devices could be mounted on this swing door. A separate ground wire could be run to all the other devices that need to be bonded to the substation ground mat, but not to the GMR. An insulated ground wire could be run from the safety ground mat to the back of the GMR with a secondary system line to neutral voltage (VLN) rated conductor, run it by itself as far away from other conductors as practicable. The operator could stand on an insulated nonconductive grate when operating the GMR, and not touch any part of the metallic substation when operating the GMR, which is connected to the safety ground mat.

Figure 2:
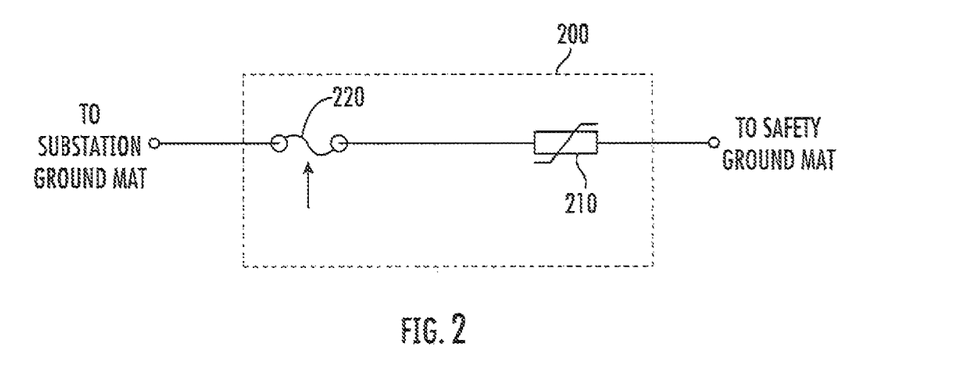
FIG. 2 is a schematic illustrating a ground mat coupling apparatus according to some embodiments of the inventive subject matter.

According to some embodiments of the inventive subject matter, a potential solution is to use a voltage-dependent resistive device, such as one or more MOVs, to couple the substation ground mat to the safety ground mat. For example, referring to FIG. 2, a ground mat coupling, apparatus 200 according to some embodiments may include at least one voltage-dependent impedance, such as a varistor 210, configured to be coupled between a substation ground and a safety ground mat. A fuse 220 or other current-responsive circuit interruption device may be coupled in series with the at least one varistor 210 to prevent formation of a low-impedance coupling between the substation ground mat and the safety ground mat in the event the at least one varistor 210 were to fail in a shorted condition. As explained below, the apparatus 200 may also be configured to provide an indication of a state of the fuse 220 to alert maintenance personnel of the need to replace the at least one varistor 210 due to a shorted failure.

Figure 3:
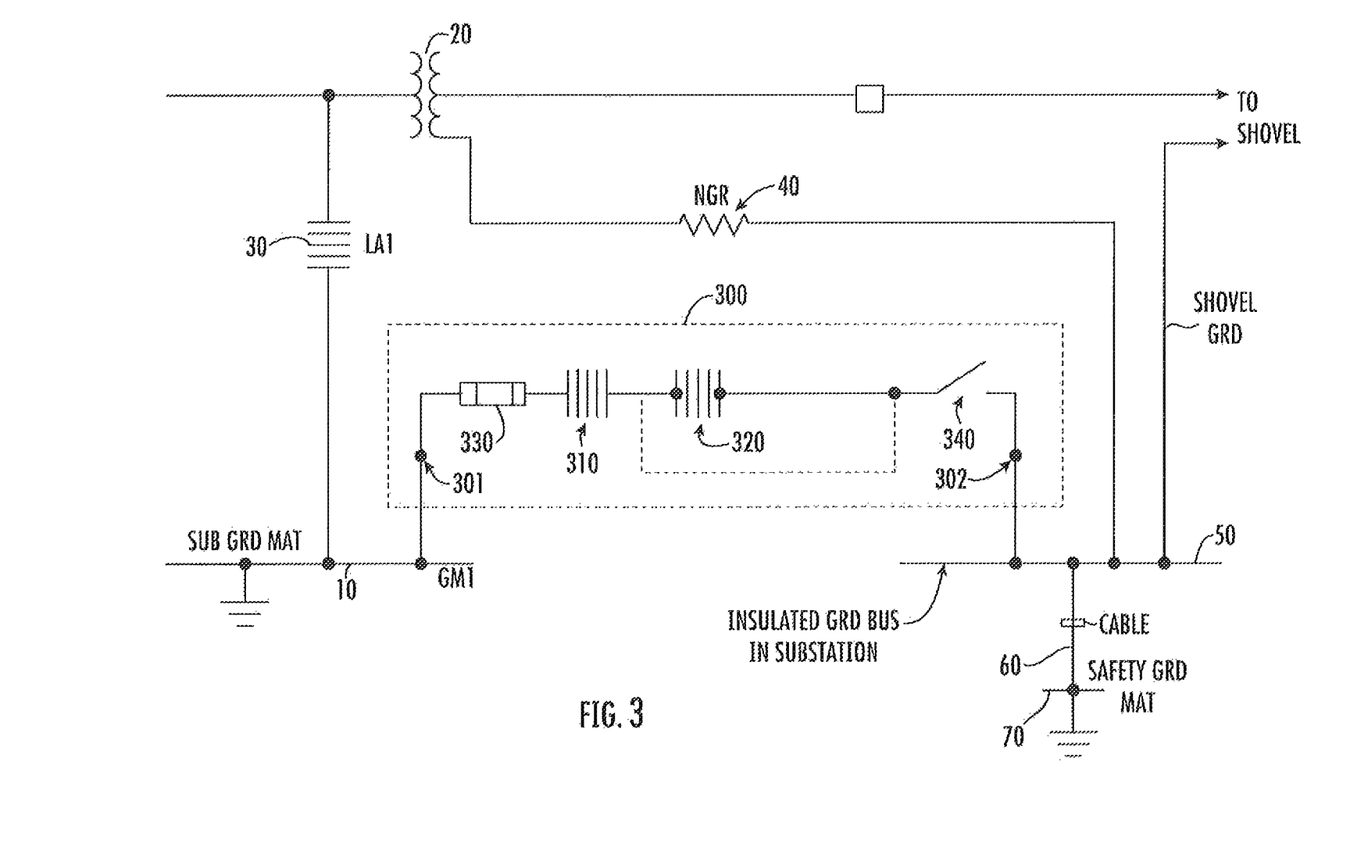
FIG. 3 is a schematic diagram illustrating aground mat coupling apparatus according to further embodiments.

FIG. 3 illustrates an example illustration of such a protection scheme in a mining application. A shovel (not shown) is powered by a substation transformer 20, which is protected by a primary MOV 30 coupled to a substation ground mat 10. A neutral grounding resistor (NGR) 40 is coupled to a safety ground mat 70 via an insulated ground bus 50 at the substation and a cable 60 that connects the insulated ground bus 50 to the safety ground mat 70. A ground wire of the shovel is coupled to the insulated ground bus 50.

A ground mat coupling apparatus 300 includes a first terminal 301 coupled to the substation ground mat 10 and a second terminal 302 coupled to the safety ground mat 70 via the insulated ground bus 50. A first MOV 310 is coupled to the first terminal 301 via a fuse 330. The fuse 330 may provide an indication of its state using, for example, a striker pin or other indicator mechanism. The first MOV 310 may be coupled to the second terminal 302 via a disconnect switch 340, either directly (dashed line) or via a second MOV 320. The second MOV 320 may have a lower breakdown voltage than the first MOV 310, and may be connected in series with the first MOV 310 when an application requires a higher breakdown voltage/maximum continuous operating voltage (MCOV) than would be provided by the first MOV 310 alone.

Figure 4:
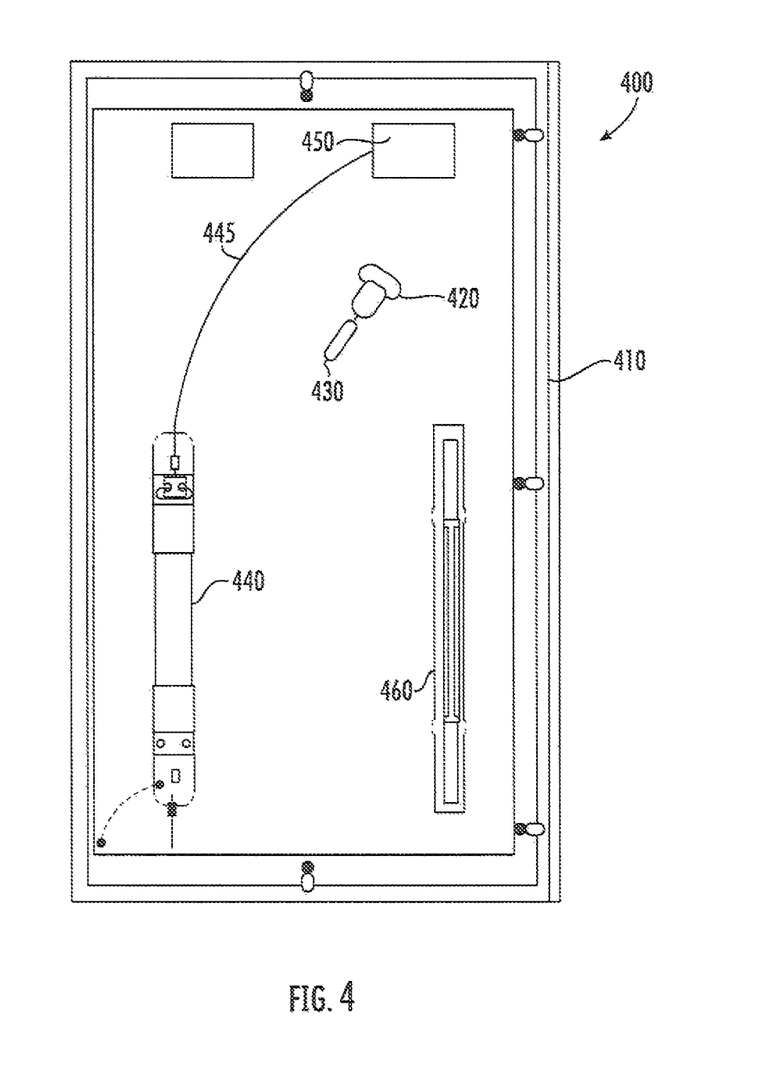
FIGS. 4-6 are front, side and perspective views, respectively, of a ground mat coupling apparatus according to some embodiments.
Figure 5:
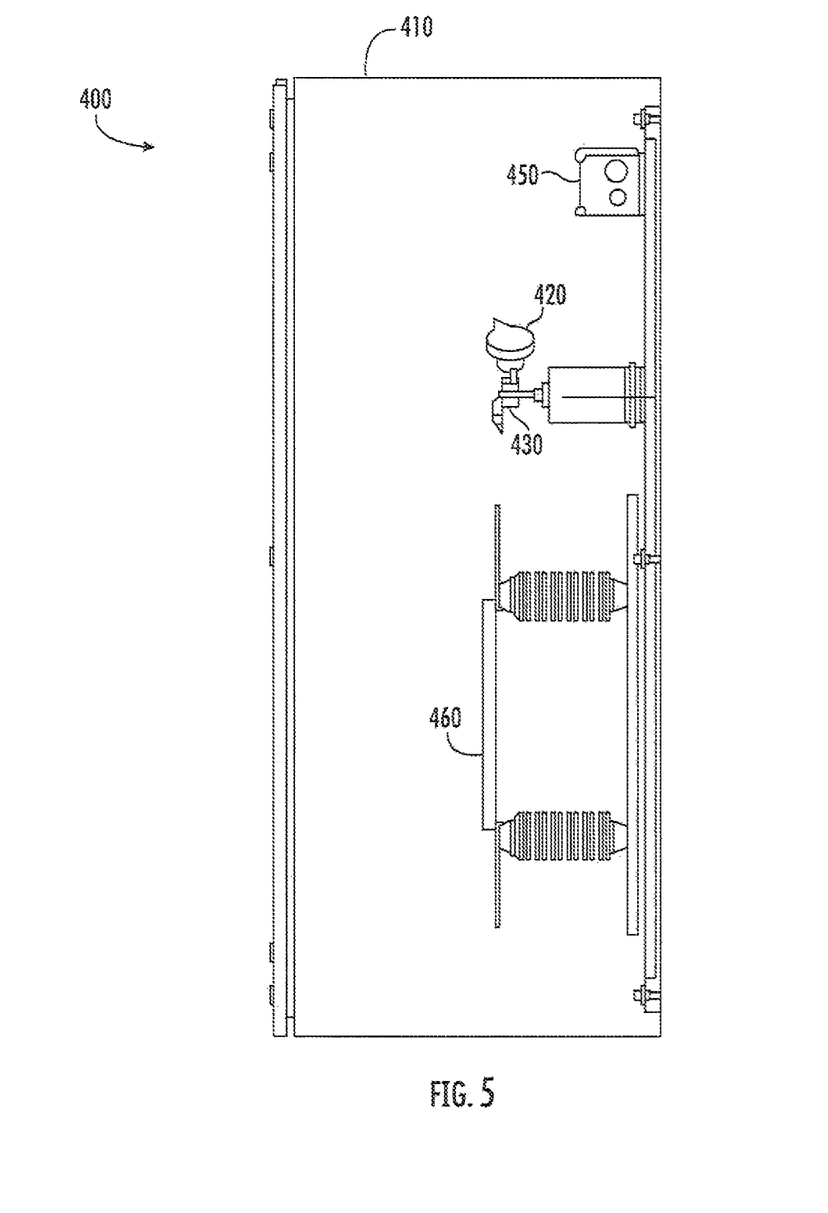
Figure 6:
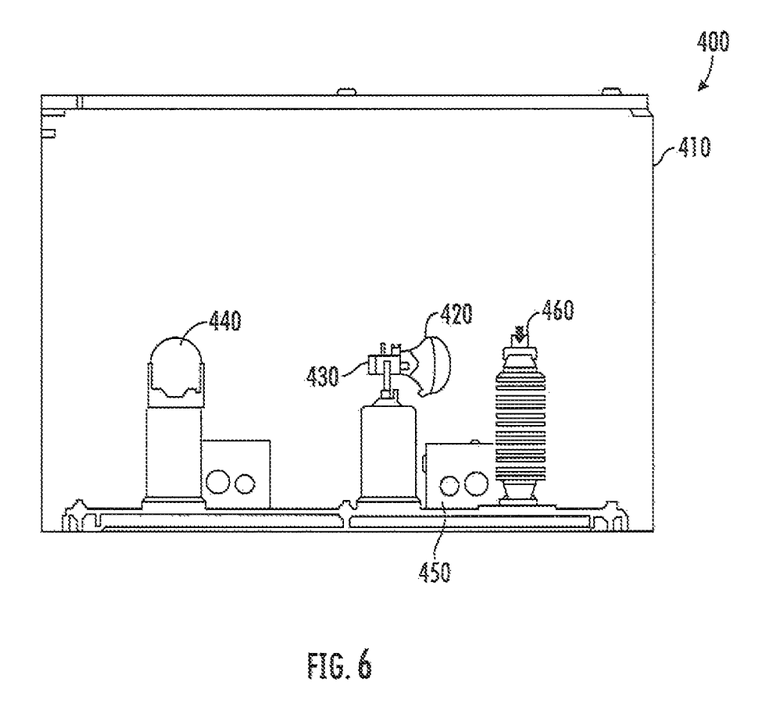

Referring to FIGS. 4-6, a ground mat coupling apparatus along the lines described above may be housed in an enclosure located at the substation. A ground mat coupling apparatus 400 includes an enclosure 410 that houses a first MOV 420 and a second MOV 430. A fuse 440 is coupled to the first MOV 420 and has a striker pin that is mechanically coupled via a flexible member to a notification device 450, which may include, for example, a microswitch or other contact set that may be wired to an external monitoring system. The contacts of the notification device 450 may be actuated by movement of the striker pin of the fuse 440. The second MOV 430 is connected to a disconnect switch 460, which may be used to disconnect the MOVs 420, 430 and the fuse 440 from the safety ground mat for maintenance and/or replacement operations.

Along lines discussed above, the second MDV 430 may optionally be removed and the first MOV 420 directly connected to the disconnect switch 460, depending on the impedance between the substation ground mat and the safety ground mat. The first MOV 420 may be, for example, an Eaton Cooper Power Series Type S4 surge arrester with a 600V rated voltage and a 650V MCDV, while the second MDV 430 may be, for example, a Cooper Power Series Type L surge arrester with a 175V nominal rating and an 1100V spark over rating. In the event of a primary ground fault to the substation ground mat, or a lightning discharge through the primary arresters to the substation ground mat, the apparatus 400 can clamp the voltages between a substation ground mat and a safety ground mat to approximately 700V-750V using only the 650 MCOV Type 54 arrester under ground fault conditions and 2100V for light wing (8×20 wave shape). If a higher voltage setting is desired (for example, due to too many fuse operations between the ground mats), then the Type U arrester can be connected in series with the type S4 arrester. The series combination can operate under ground fault conditions for a voltage magnitude above 1750V and may clamp the lightning discharge voltage to about 3.2 kV. The Type L arrester may short circuit during conduction, so it is undesirable to use it alone, as it could tie the ground mats together, thereby transferring voltage to the shovel and violating MSHA requirements during conduction. Keeping the Type S4 arrester always in the circuit can prevent shorting and keep the ground mats separate.

The decision as to whether to use the Type S4 arrester alone or use the series combination of the Type S4 arrester and the Type L arrester can be based on voltage measurements between the ground mats. For example, if the steady state voltage between ground mats is below about 600 Vrms, then the single Type S4 arrester may be used. If the steady state voltage between the ground mats is greater than about 600V but less than about 1500V, then the series combination of the Type S4 and Type L arresters may be used. If the voltage between the ground mats is greater than 1500V steady state, then there may be a problem with the ground mat installation or wiring.

It will be appreciated that the arresters may only need to handle the voltage difference between the substation ground mat and the safety ground mat. Most of the discharge during a lightning discharge current will likely go thru the substation ground mat to earl. A smaller amount (on order of 10% to 20%) of discharge current will likely flew via the safety ground mat, which can allow a relatively low clamping voltage to be used with relatively low energy levels.

Referring again to FIGS. 4-6, the MOVs 420, 430, if they fail, will fail short circuited. To reduce or prevent the likelihood that the ground mats will become tied together, the circuit is fused with the current limiting fuse 440, which may blow in a sub-cycle (less than ½ cycle) during a major discharge where the arresters 420, 430 could fail, thereby preventing the ground mats from being inadvertently tied together if the arresters fail in shorted condition. The fuse 440 can actuate the contacts of the notification device 450 to indicate that the fuse 440 has blown. It will be appreciated that the indicator mechanism shown is provided for purposes of illustration, and that other indicator mechanisms may be used. In addition, while FIGS. 4-6 illustrate a coupling system enclosed in a cabinet, components as illustrated in FIGS. 3-6 may be installed in other structures, such as behind a clear acrylic shield within a protected (locked and isolated) area of a substation.

Using a combination of arresters as described above with reference to FIGS. 4-6, voltage between the ground mats may be limited to between 750V and 1750V under 60 Hz ground faults and between 2100 and 3200V under lightning discharge conditions. Under-ground fault conditions in the trailing cable or at the shovel, the voltage difference may be limited to the MSHA requirement of 100V max. The voltage difference between the ground mats may not be high enough to trigger the coupling circuit between the mats, thereby maintaining ground mat isolation. Assuming some systems may cause excessive conduction resulting in the remote possibility of arrester failure, the ground mat coupling circuit is fused to maintain MSHA requirements.

It is preferable that the fuse 440 is coupled between the arrester(s) 420, 430 and the high energy source of the substation ground mat rather than between the arresters and the safety ground mat. The voltage rating of the fuse 440 may be selected to be the line-to-ground voltage (VLG) of the secondary side of the substation transformer. Under rare cases, the secondary voltage may short to the ground mats and the secondary VLG could be impressed across it, so it is desirable for the fuse 440 to be able to clear such a fault. In an example case, the upper probable ground fault current was estimated to be around 5000 A, and calculations suggest that 710 amps would flow thru the earth to the safety ground mat. If the arrester(s) 420, 430 clamp to about 800 VAC this fault current may increase to about 926 A, but only about 50% of the ground fault current would flow dun the arrester path. Allowing a 10%-20% margin, a fuse with a minimum melt curve just above the 110% to 120% value would be desirable.

Figure 7:
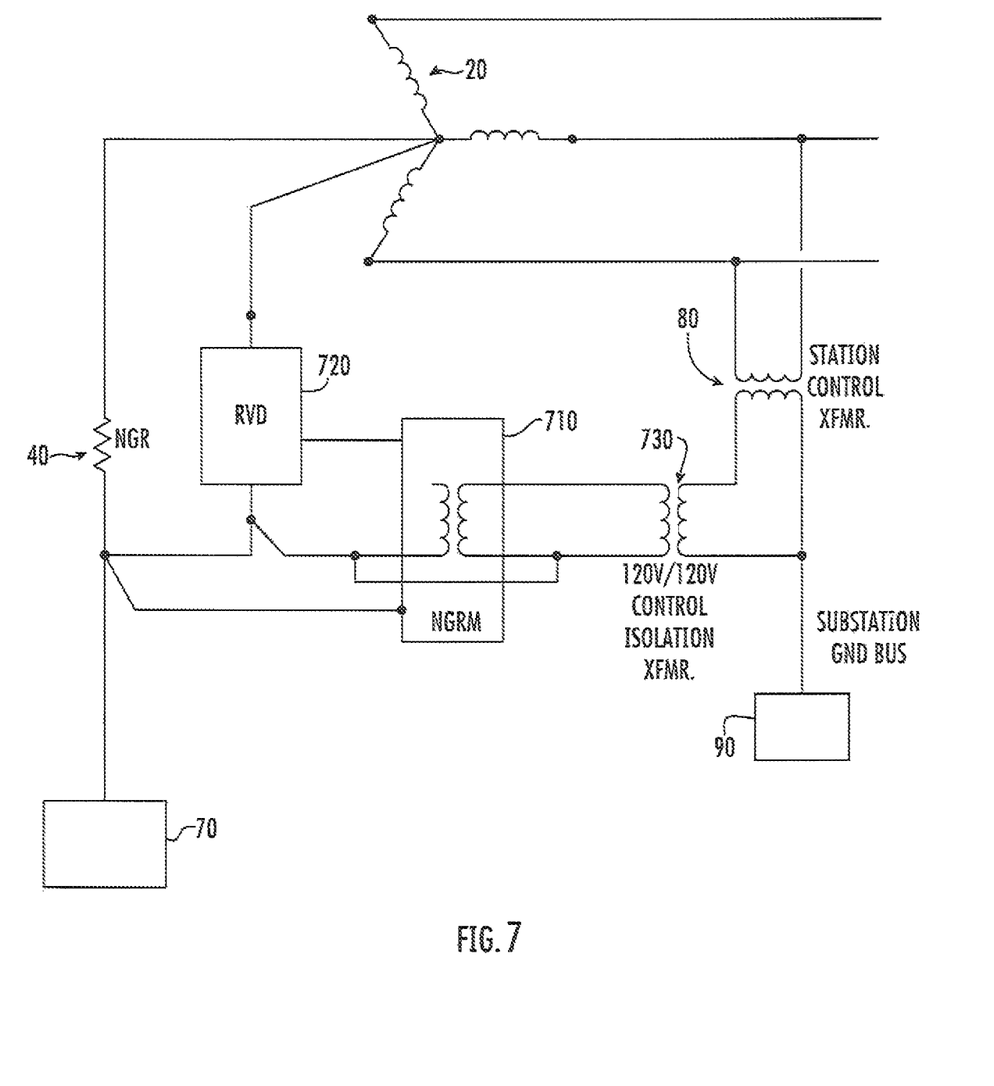
FIGS. 7 and 8 illustrate arrangements for a neutral ground resistor monitor (NGRM) according to further embodiments.

In some embodiments, use of an NGRM may be desirable. The NGRM may be located in the substation but connect across the NGR that is connected to the safety ground mat and is therefore subject to the same ground mat voltage differences as the GMR. FIG. 7 illustrates an example arrangement of a NORM according to some embodiments. A resistive voltage divider (RVD) 720 is coupled between a wye point of the substation transformer 20 and the safety ground mat, and has an output coupled to an NGRM 710. The NGRM 710 is also coupled to a substation control transformer 80 (which is grounded to a substation ground bus 90) via an isolation transformer 730. Conductors between the RVD 720 and the wye point of the substation transformer 20, the safety around mat and the NGRM 710 may be rated at least to the line-to-neutral voltage (VLN), and may be routed separately from low voltage wiring (e.g., the wiring from the isolation transformer 730) to reduce the likelihood of arc flash generation. It may be desirable to locate the RVD 720 at a height that is not normally accessible to personnel or in a protective enclosure of medium voltage items, such as a cabinet for the NOR 40.

Figure 8:
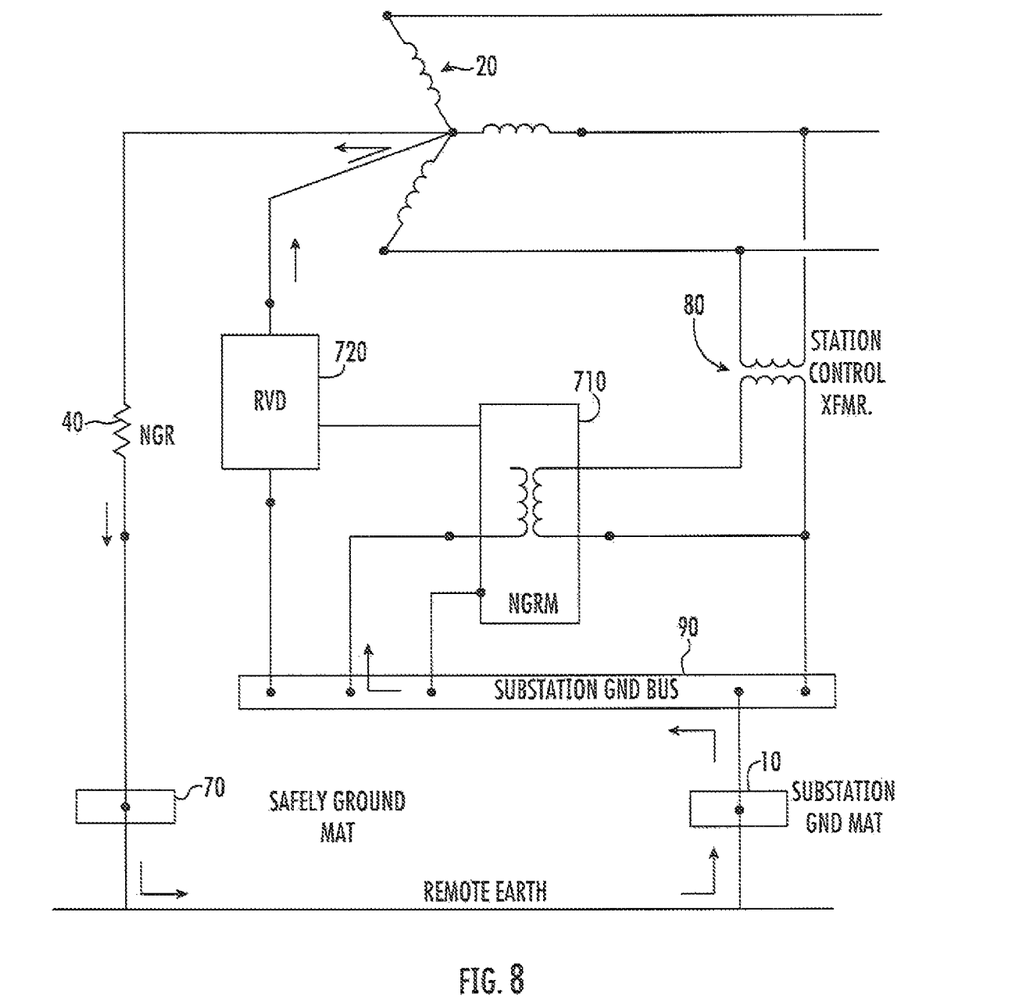

FIG. 8 illustrates, an alternative arrangement. Unlike the arrangement of FIG. 7, the RVD 720 and the NGRM 710 are connected to the substation ground mat 10 via the substation ground bus 90. DC current will then flow as shown by the arrows in FIG. 8 with the resistance of the earth between substation ground mat 10 and the safety ground mat 70 being part of the circuit. If the resistance of the NGR 40 is significantly greater than the resistance between the substation around mat 10 and the safety ground mat 70 and there is no other DC current available in this path, then it is possible to calibrate the this additional resistance. In this arrangement, the NGRM 710 is not subject to the voltage difference between the ground mats. This arrangement also allows for elimination of the isolation transformer 730 shown in FIG. 7. However, the conductor from the transformer wye point is still a risk, so it may be desirable to locate the RVD 720 as described above with reference to FIG. 7.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   a substation;
   a substation ground mat for the substation;
   a safety ground mat for a piece of equipment powered by the substation;
   a first terminal coupled to the substation ground mat;
   a second terminal coupled to the safety ground mat; and
   at least one voltage-dependent resistance device coupled between the first and second terminals.

2. The apparatus of claim 1, wherein the at least one voltage-dependent resistance device comprises at least one metal oxide varistor (MOV).

3. The apparatus of claim 2, wherein the at least one MOV comprises:
   a first MOV having a first breakdown voltage; and
   a second MOV coupled in series with the first MOV and having a second breakdown voltage less than or equal to the first breakdown voltage.

4. The apparatus of claim 3, wherein the second MOV is configured to be bypassed while the first MOV is coupled between the first and second terminals.

5. The apparatus of claim 1, further comprising at least one circuit interruption device coupled in series with the at least one voltage-dependent resistance device.

6. The apparatus of claim 5, wherein the at least one circuit interruption device comprises a current-responsive circuit interruption device.

7. The apparatus of claim 6, wherein the current-responsive circuit interruption device comprises a fuse.

8. The apparatus of claim 6, further comprising an indicator device configured to be triggered by the current-responsive circuit interruption device.

9. The apparatus of claim 6, wherein the at least one circuit interruption device further comprises a disconnect switch coupled in series with the current-responsive circuit interruption device.

10. A system comprising:
    a substation;
    a substation ground mat for the substation;
    a safety ground mat for a piece of electrical equipment powered by the substation; and
    a ground mat coupling apparatus comprising:
    an enclosure;
    a first terminal coupled to the substation ground mat;
    a second terminal coupled to the safety ground mat;
    at least one varistor mounted in the enclosure; and
    a fuse mounted in the enclosure and coupled in series with the at least one varistor between the first and second terminals.

11. The system of claim 10, wherein the at least one varistor comprises at least one metal oxide varistor (MOV).

12. The system of claim 11, wherein the at least one MOV comprises:
    a first MOV having a first breakdown voltage; and
    a second MOV coupled in series with the first MOV and having a second breakdown voltage less than or equal to the first breakdown voltage.

13. The system of claim 10, further comprising an indicator device mounted in the enclosure and configured to be triggered by the fuse.

14. The system of claim 13, wherein the indicator device comprises a contact set configured to be actuated by a striker of the fuse.

15. The system of claim 10, further comprising a disconnect switch mounted in the enclosure and coupled in series with the fuse and the at least one varistor.

16. The system of claim 10, wherein the enclosure is installed at the substation.

17. A method comprising:
    connecting a safety ground mat for a piece of electrical equipment powered by a substation to a substation ground mat for the substation via at least one voltage-dependent resistance device.

18. The method of claim 17, wherein the at least one voltage-dependent resistance device comprises at least one varistor.

19. The method of claim 18, further comprising connecting a fuse in series with the at least one varistor.

20. The method of claim 19, further comprising coupling an indicator device to the fuse.

\* \* \* \* \*

UNITED STATES PATENT AND TRADEMARK OFFICE
CERTIFICATE OF CORRECTION

| | |
|---|---|
| PATENT NO. | : 11,316,325 B2 |
| APPLICATION NO. | : 16/738776 |
| DATED | : April 26, 2022 |
| INVENTOR(S) | : Moore et al. |

It is certified that error appears in the above-identified patent and that said Letters Patent is hereby corrected as shown below:

On the Title Page

(57) Abstract, Line 3: Please correct "safety around" to read -- safety ground --
Line 9: Please correct "switch may" to read -- switch, may --

In the Specification

Column 5, Line 11: Please correct "650V MCDV" to read -- 650V MCOV --

Column 5, Line 12: Please correct "MDV" to read -- MOV --

Column 5, Line 19: Please correct "Type 54" to read -- Type S4 --

Column 5, Line 23: Please correct "Type U" to read -- Type L --

Column 6, Line 40: Please correct "NORM" to read -- NGRM --

Column 6, Line 56: Please correct "NOR 40" to read -- NGR 40 --

Signed and Sealed this
Fourteenth Day of June, 2022

Katherine Kelly Vidal
*Director of the United States Patent and Trademark Office*